June 23, 1936.    J. M. ROWLAND    2,045,413
METERING SYSTEM
Filed July 21, 1932
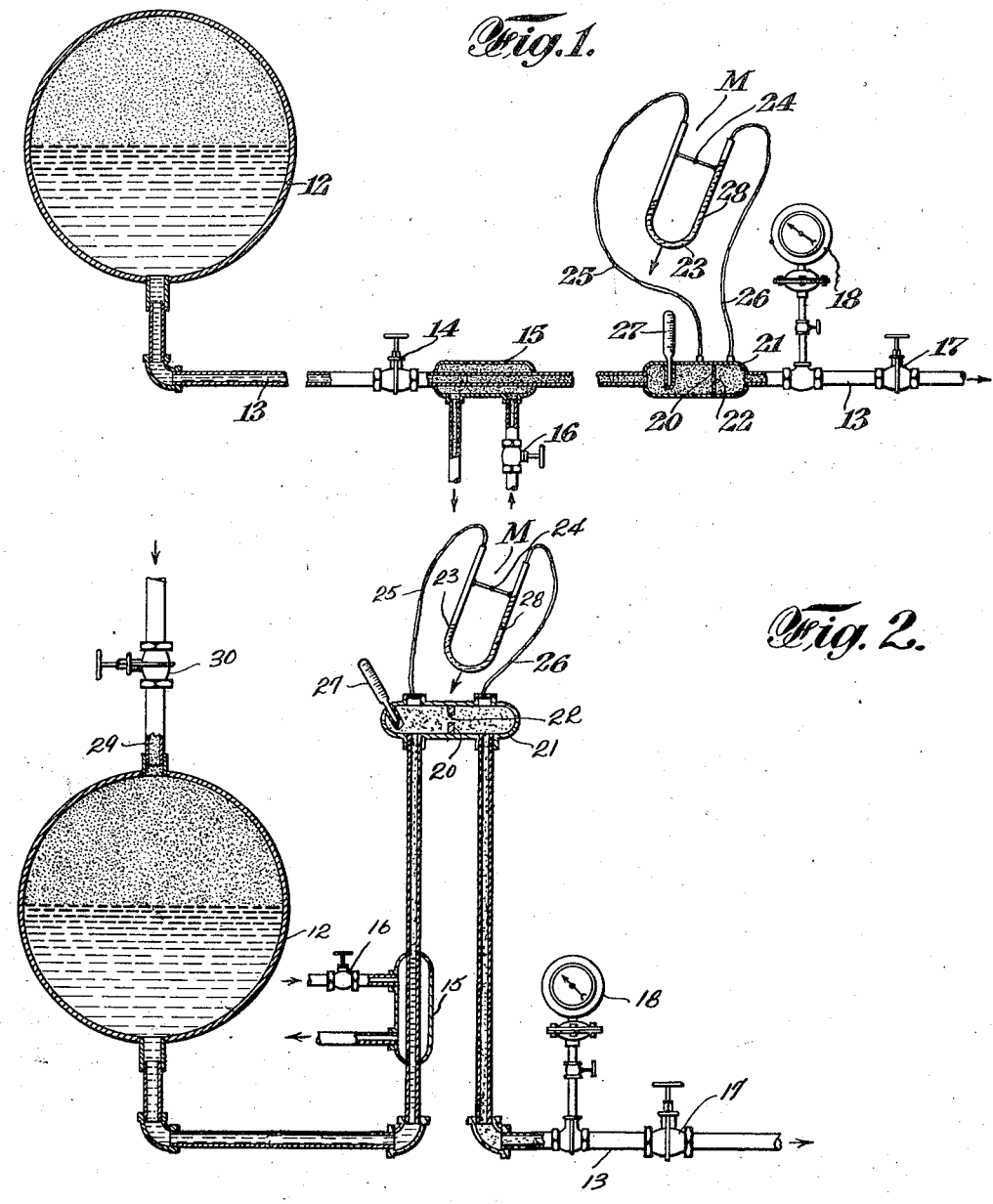

Patented June 23, 1936

2,045,413

UNITED STATES PATENT OFFICE 2,045,413

METERING SYSTEM

Jasper M. Rowland, late of Niagara Falls, N. Y., deceased, by Annie Gage Rowland, executrix, Niagara Falls, N. Y., assignor to Hooker Electrochemical Company, Niagara Falls, N. Y., a corporation of New York Application July 21, 1932, Serial No. 623,759

5 Claims. (Cl. 73—198)

This invention relates to the metering of volatile fluids in vapor phase and particularly to metering means giving a continuous indication of the rate of fluid flow.

Some fluids such for instance as chlorine are difficult to handle, tending to react or mix with other materials and to leak out of confining apparatus in objectionable manner.

The object of this invention is to provide a metering system for chlorine and similar fluids which will be safe and accurate and dependable in operation to give a continuous indication of the flow of the passing fluid.

Other objects of the invention will appear from the following description taken in connection with the accompanying drawing in which Fig. 1 is a view illustrating a system of measuring the flow of chlorine gas, Fig. 2 is a view illustrating a modification of Figure 1.

In the system illustrated in Fig. 1 the chlorine in liquid form is contained in tank 12 under pressure and passes out through pipe 13 to control valve 14 where the pressure is dropped well below the vaporizing pressure at any temperature likely to be met with in use. The water jacket 15 just beyond the control valve 14 supplies the heat of vaporization as the chlorine passes from liquid to gas phase, the jacket having its circulation of water regulated by the valve 16 to maintain a substantially constant temperature of the gas as shown for instance on the thermometer 27.

The chlorine flow has a second valve 17 controlling the back pressure on the gas to maintain its density as desired, this back pressure being indicated on the gage 18. The valves 14 and 17 are manually controlled. These valves may be manipulated in the same sense, i. e., whenever one is opened the other is likewise opened, and vice versa, the opening of one valve being co-related with that of the other so as to maintain a predetermined constant reading upon gage 18. The temperature of the gas, being the boiling temperature corresponding to the pressure, will likewise remain constant, and in this way, the density of the gas at the point of metering will be constant and there will be a constant relationship between volume and weight. This permits calibrating the apparatus at the predetermined pressure to be maintained upon gage 18, and volume measurements of the gas may be readily converted to weight measurements, or the metering means may be graduated to read directly in units of weight per unit of time.

At some convenient point an orifice plate or diaphragm 20 is interposed, and in the system shown in Fig. 1 this is placed in enlargement 21 of the flow conduit. The diaphragm 20 has an orifice 22 accurately sized to give a desired drop in pressure between its opposite sides with the high pressure on the left or upstream side and the lower pressure on the right or downstream side. The difference between these pressures will vary with the flow and by measuring the difference, the rate of flow may be measured and the gas metered in the apparatus of this invention. The drop in pressure in the orifice 22 is, of course, slight and its effect upon the density of the gas negligible.

Such indicating means is shown diagrammatically at M comprising a U tube 23 pivoted at 24 and having pressure connections 25 and 26 to opposite sides of the diaphragm 20. The tubes 25 and 26 are flexible so as not to interfere with the turning movements of the U tube 23 around its pivot 24.

The U tube 23 contains a liquid 28, such as sulfuric acid, forming connected columns which will be of equal height for equal pressures at their surfaces, but will change in height according to variations in pressure as transmitted by the connections 25 and 26. Higher pressure on the left or upstream side will depress the corresponding column and raise the opposite column so as to shift the center of gravity of the U tube and its contents and cause a tilting of the tube clockwise as shown in Fig. 1.

Such tilting movement may be connected up to indicating, recording and integrating apparatus to give the desired showing of the fluid flow.

It will be evident in Fig. 1 the valve 14 may be replaced by an automatic pressure reducing valve or dispensed with altogether. The valve 17 then serves to regulate the flow. In this case it is necessary to maintain a constant pressure within the tank 12, by means of air supplied through pipe 29 and valve 30. In this way the condition of constant pressure upon the gas may be fulfilled, and as the gas leaving evaporator 15 will be at the boiling temperature of the liquid to be metered corresponding to this pressure, the condition of constant density will be realized and the gas may be metered in units of weight per unit of time as when the valve 14 is present and used as described above. Air for this purpose may be supplied as in Fig. 2 and the same means may be used to supply air above the sulphuric acid in the meter, which is useful when metering in gas phase, as it protects the fine tubes 25, 26 against corrosion and stoppage.

What is claimed is:

1. In a system for measuring in vapor phase the rate of flow in units of weight per unit of time of a confined volatile liquid under variable temperature, means for maintaining said liquid at constant predetermined pressure, means supplying heat for evaporating said liquid at said constant predetermined pressure, means for regulating the flow of the resulting vapor and means for metering the flow of said vapor, while said vapor is in free contact with its liquid in said evaporating means at said predetermined pressure and the corresponding equilibrium temperature, said metering means including means for expressing the flow directly in units of weight.

2. In a system for measuring in vapor phase the rate of flow in units of weight per unit of time of a confined volatile liquid under variable temperature and pressure, means for regulating the flow of said liquid, means supplying heat for evaporating said liquid to vapor phase, means regulating the flow of said vapor to maintain said vapor under substantially constant predetermined pressure and means for metering said vapor, while said vapor is in free contact with its liquid at said predetermined pressure and at the corresponding equilibrium temperature, said metering means including means for expressing the flow in units of weight.

3. In a system for measuring in vapor phase at constant density the rate of flow of a confined volatile liquid under variable temperature and pressure, the combination of valve means for regulating the flow of said liquid, means for evaporating said liquid, after it has passed said valve, to vapor phase, valve means adapted for coordination with said first mentioned valve means for regulating the flow of said vapor to maintain said vapor under substantially constant predetermined pressure, and means located between said evaporating means and said vapor regulating means for indicating the pressure of said vapor and metering said vapor, while said vapor is in free contact with its liquid at said predetermined pressure and at the corresponding equilibrium temperature.

4. In a system for measuring the flow of a fluid, a source of said fluid in liquid phase, evaporating means supplied from said source and acting to evaporate the liquid as supplied while maintaining the vapor in free contact with its liquid, means for maintaining said evaporation at a constant predetermined pressure and the corresponding equilibrium temperature, and means for metering the flow of the vapor while maintaining said conditions.

5. In a system for measuring in vapor phase the rate of flow in units of weight per unit of time of a confined volatile liquid under variable temperature, means for supplying air above said liquid to maintain said liquid at constant predetermined pressure, means supplying heat for evaporating said liquid at said constant predetermined pressure, means for regulating the flow of the resulting vapor and means for metering the flow of said vapor, while said vapor is in free contact with its liquid in said evaporating means at said predetermined pressure and the corresponding equilibrium temperature, said metering means including means for expressing the flow directly in units of weight.

ANNE GAGE ROWLAND,
*Executrix of the Last Will and Testament of Jasper M. Roland.*